United States Patent [19]

Shimada et al.

[11] 3,928,476

[45] Dec. 23, 1975

[54] PROCESS FOR NITRATION OF HALOGENATED BENZENE DERIVATIVES

[75] Inventors: Keizo Shimada; Takeo Nishikawa, both of Hino; Toshiaki Harada, Hachioji; Shizuo Nagahama, Hino, all of Japan

[73] Assignee: Teitin Ltd., Osaka, Japan

[22] Filed: Feb. 20, 1974

[21] Appl. No.: 444,158

[30] Foreign Application Priority Data
Feb. 26, 1973 Japan................................ 48-22255

[52] U.S. Cl.................................. 260/646; 252/466
[51] Int. Cl.². ........................................ C07C 79/12
[58] Field of Search..................................... 260/646

[56] References Cited
UNITED STATES PATENTS
3,038,865   8/1962   Abrahams............................ 252/466

Primary Examiner—Leland A. Sebastian
Attorney, Agent, or Firm—Sherman & Shalloway

[57] ABSTRACT

A process for nitrating halogenated benzene derivatives, which comprises reacting a halogenated benzene devirative with nitric acid in the liquid phase in the presence of a catalyst composed of an oxyacid of sulfur or phosphorus supported on silica-alumina and/or alumina.

6 Claims, No Drawings

PROCESS FOR NITRATION OF HALOGENATED BENZENE DERIVATIVES

This invention relates to a process for nitration of halogenated benzene derivatives.

Nitrated halobenzene derivatives are used as intermediates suitable for preparing various compounds. Of these, a para-isomer of a monohalogenated mononitrobenzene, is useful as an intermediate for p-nitroaniline or p-phenylene diamine which are important as materials for producing dyes or synthetic fibers. Furthermore, 1,2-dichloro-4-nitrobenzene (a nitration product of o-dichlorobenzene) and 2,5-dimethyl-1-chloro-4-nitrobenzene (a nitration product of 2,5-dimethyl-1-chlorobenzene) are also equally useful compounds.

According to the conventional method of nitrating halobenzenes using mixed acids, the ratio of 1-chloro-4-nitrobenzene to 1-chloro-2-nitrobenzene in the nitration product of monochlorobenzene, for example, is about 1.5 to 1.8, and the nitration product contains 1 to 2% of 1-chloro-3-nitrobenzene. Therefore, this conventional method is not suitable for nitrating halogenated benzenes to form p-isomers as main products.

A method was previously proposed which comprises nitrating monochlorobenzene in the presence of sulfuric acid and a carboxylic acid such as acetic acid to produce a larger proportion of a p-isomer (U.S. Pat. No. 3,180,900), and this patent discloses that the ratio of p-isomer to o-isomer can be raised up to 2.9.

This method, however, is not entirely satisfactory for commercial operation because the recovery of waste sulfuric acid and carboxylic acid after the reaction is complicated.

It is an object of this invention therefore to provide a process for nitrating halogenated benzene derivatives to form a product having a high ratio of the p-isomer to the o-isomer with advantage.

Another object of this invention is to provide a process for nitrating halobenzene derivatives which does not require treatment of the spent acid.

The foregoing objects of this invention are achieved by a process for nitrating halobenzene derivatives, which comprises reacting a halobenzene derivative with nitric acid in the liquid phase in the presence of a catalyst composed of an oxyacid of sulfur or phosphorus supported on silica-alumina and/or alumina.

In the present specification, the p-isomer and the o-isomer are defined as shown below, and accordingly, the p/o ratio denotes the molar ratio of the p-isomer to the o-isomer.

1. Monohalogenated mononitrobenzene derivatives:

Those having a nitro group at the p-position to the halogen atom are defined as p-isomers, and those having a nitro group at the o-position to the halogen atom as o-isomers.

2. Dihalogenated mononitrobenzene derivatives:

In the case of 1,3-dihalogenated compounds, those having a nitro group at the 4- or 6-position are defined as p-isomers, and those having a nitro group at the 2-position as o-isomers. In the case of 1,2-dihalogenated compounds, those having a nitro group at the 4-position or 5-position are defined as p-isomers, and those having a nitro group at the 3- or 6-position, as o-isomers.

3. Trihalogenated mononitrobenzene derivatives:

In the case of 1,2,3-trihalogenated compounds, those having a nitro group at the 5-position are defined as p-isomers, and those having a nitro group at the 4- or 6-position as o-isomers. In the case of 1,2,5-trihalogenated compounds, those having a nitro group at the 4-position are defined as p-isomers, and those having a nitro group at the 3- or 6-position as o-isomers.

Thus, in the present invention halobenzene derivatives of the following formula are conveniently used.

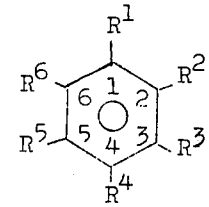

wherein $R^1$ is a halogen atom; $R^4$ is a hydrogen atom; $R^2$, $R^3$, $R^5$ and $R^6$ independently represent a hydrogen atom, a halogen atom or an alkyl group; at least one of $R^2$, $R^3$, $R^5$ and $R^6$ is a hydrogen atom; the total number of halogen atoms is not more than 3 including $R^1$; when there is one halogen atom and both $R^3$ and $R^6$ are alkyl groups, $R^2$ is a hydrogen atom; when there are two halogen atoms and $R^3$ is a halogen atom, $R^2$ is a hydrogen atom, when there are two halogen atoms and $R^2$ is a halogen atom, at least one of $R^3$ and $R^6$ is a hydrogen atom; when there are three halogen atoms, $R^2$ is a halogen atom and $R^5$ is a hydrogen or halogen atom; and when there are at least 2 halogen atoms including $R^1$, the substituent halogen atoms are substituted at positions such that the sum of the numbers 1 to 6 showing the substituting positions attached to the inside of the benzene ring in the above formula becomes minimum.

Thus, the above formula does not include compounds which can produce only one kind of mononitro compound, such as a 1,3-dihalogeno-2,5-dialkylbenzene, a 1,2,3-trihalogeno-5-alkyl benzene, or a 1,3,5-trihalogeno benzene and compounds which cannot produce corresponding o-isomers, such as a 1-halogeno-2,3,6-trialkylbenzene, a 1,3-dihalogeno-2-alkylbenzene, a 1,3-dihalogeno-2,6-dialkylbenzene, or a 1,2-dihalogeno-3,6-dialkylbenzene.

Examples of the silica-alumina used as a carrier in the present invention are synthetic silica alumina, activated clay, and acid-treated acidic clay. Synthetic silica-alumina containing at least 5% by weight of alumina is preferably used. Examples of the alumina are γ-alumina and η-alumina.

It is recommended that the carrier be used in the powdery form, but it can also be in the form of pellets each having a diameter of 0.1 to 5 mm and a length of about 1 to 10 mm, or tablets each with a size of 1 to 10 mm.

Examples of the oxyacid of sulfur or phosphous that can be used in the present invention are sulfuric acid, pyrosulfuric acid, peroxysulfuric acid, phosphoric acid, phosphoric acid anhydride, polyphosphoric acid, phosphorous acid, and hypophosphoric acid. Of these, sulfuric acid and phosphoric acid are especially preferred.

The catalyst of this invention is composed of the sulfur or phosphorus oxyacid supported on the silica-alumina and/or alumina carrier. It can be prepared easily by mixing the oxyacid with the carrier, to impregnate the oxyacid in the carrier. The catalyst so prepared can be directly used for the reaction, but it is preferred that prior to use, it should be calcined at a temperature of at least 100°C. A more preferred catalyst is prepared by impregnating the carrier with sulfuric acid or phosphoric acid, and then calcining it at a temperature of at least 100°C, preferably 100° to 250°C., for sulfuric acid, and preferably 100° to 450°C., for phosphoric acid.

The amount of the sulfur or phosphorus oxyacid to be supported is about 2 to 1/10 times the weight of the silica-alumina and/or alumina carrier, especially preferably about 1 to 1/5 times the weight of the carrier.

The sulfur or phosphorus oxyacid can be supported on a carrier by any methods, such as a method comprising mixing the oxyacid with the carrier either as such or after dissolving or diluting in or with water, or a method comprising immersing the carrier in an oxyacid solution containing an excess of the oxyacid, withdrawing it from the solution and then drying it. There is a tendency, however, that when the amount of the oxyacid supported is too large, the p/o ratio in the product decreases. On the other hand, if the amount of the oxyacid supported is too small, the amount of the catalyst to be used should naturally increase, and it causes disadvantages in operation.

Nitric acid used as a nitrating agent in the process of this invention can be any desired grade. It is advantageous to use commercial grade concentrated nitric acid, and fuming nitric acid having a specific gravity of about 1.52 is especially preferred.

The halogenated benzene derivatives to be nitrated in accordance with the process of this invention include, for example, chlorobenzenes such as monochlorobenzene, o-chlorotoluene, m-chlorotoluene, o-chloroethylbenzene, o-chloropropylbenzene, monochloro-p-xylene, 1-chloro-2,3-dimethylbenzene, 1-chloro-3,5-dimethylbenzene, 1-chloro-2,3,5-trimethylbenzene, o-dichlorobenzene, 1,2-dichloro-3-methylbenzene, 1,2-dichloro-5-methylbenzene, 1,2-dichloro-3,5-dimethylbenzene, 1,2-dichloro-5,6-dimethylbenzene, m-dichlorobenzene, 1,3-dichloro-5-methylbenzene, 1,3-dichloro-5-ethylbenzene, 1,3-dichloro-5,6-dimethylbenzene, 1,2,3-trichlorobenzene, 1,2,3-trichloro-6-methylbenzene, 1,2,5-trichlorobenzene, 1,2,5-trichloro-6-methylbenzene, and 1,2,5-trichloro-3-methylbenzene; and the corresponding bromobenzenes. Of these compounds, those in which the total number of the halogen atoms and the alkyl groups is not more than 3 are preferred, and monohalogenated benzenes are especially preferred.

The nitration of halogenated benzene derivatives in accordance with the process of this invention can be performed by adding a predetermined amount of the above catalyst to the halogenated benzene derivative, and adding nitric acid dropwise while dispersing the catalyst in the halogenated benzene derivative with stirring.

In this reaction, a non-reactive solvent may be used. Preferably, however, the halogenated benzene is used in an excessive amount in order to make it serve also as the solvent.

The reaction is carried out at room temperature to about 100°C.

Nitric acid is used in an amount of 5 to 50 mol %, preferably 10 to 30 mol %, based on the halogenated benzene. The amount of the catalyst is not specifically limited, and may be within such a range as will make the stirring of the reaction system possible. Usually, the amount of the catalyst is 0.4 to 1 part by weight based on the halogenated benzene.

After the reaction, the catalyst is separated by filtration, and the product is separated by distillation.

The conversion and yield vary according to the amounts of nitric acid and the catalyst, and the reaction time. For example, at a conversion of about 10%, a yield of 90% based on the nitric acid can be achieved.

The p/o ratio of the product is at least 1.9, and depending upon the reaction conditions, the ratio may be more than 2.5. The p-isomer is separated from the o-isomer by fractional crystallization in accordance with a conventional procedure.

The process of this invention makes it possible to obtain a nitration product having a p/o ratio of 2 at the lowest, and the product can be separated by a simple procedure of merely filtering off the catalyst used. The catalyst can be dehydrated and regenerated, and reused for the reaction, and therefore, a complicated procedure such as the treatment of the spent acid is not required.

The following Examples and Comparative Examples illustrate the present invention more specifically. All parts appearing in them are by weight.

EXAMPLE 1

Concentrated sulfuric acid (10 parts) were added to 20 parts of a power (80 mesh) of silica-alumina having an alumina content of 13% by weight and a surface area of 450 m²/g, and the mixture was stirred to support the sulfuric acid uniformly on the silica-alumina. The mixture was calcined at 200°C. for 2 hours to form 27 parts of a catalyst.

20 Parts of the catalyst was added to 30 parts of monochlorobenzene, and with stirring, 3 parts of fuming nitric acid having a specific gravity of 1.52 was added dropwise in the course of 40 minutes. After the addition, the temperature was raised to 40°C., and the mixture was stirred for 30 minutes. The resulting product was analyzed by gas chromatography. Unless specifically stated, the analysis in this and following Examples was conducted using a Carbowax 20M packed column (2m) at 160°C. The results are shown in Table 1. The yields in this and following Examples are based on nitric acid.

COMPARATIVE EXAMPLE 1

A mixture of 30 parts of monochlorobenzene and 6 parts of concentrated sulfuric acid was stirred, and 3 parts of fuming nitric acid was added. The reaction was performed under the same conditions as set forth in Example 1. The results are shown in Table 1.

COMPARATIVE EXAMPLE 2

The reaction was performed under the same conditions as in Example 1 using 20 parts of the same silica-alumina (not supporting sulfuric acid) as used in Example 1. The results are shown in Table 1.

Table 1

| | Catalyst | Composition of the product (%) | | | p/o | Yield (%) |
|---|---|---|---|---|---|---|
| | | p-isomer | m-isomer | o-isomer | | |
| Example 1 | Sulfuric acid supported silica-alumina | 72.1 | 0.3 | 27.6 | 2.61 | 93 |
| Comparative Example 1 | Sulfuric acid | 64.4 | 0.6 | 35.0 | 1.83 | 70 |

Table 1-continued

| Catalyst | | Composition of the product (%) | | | p/o | Yield (%) |
|---|---|---|---|---|---|---|
| | | p-isomer | m-isomer | o-isomer | | |
| Comparative Example 2 | Silica-alumina | 60.0 | 0.3 | 39.7 | 1.51 | 17 |

EXAMPLES 2 TO 4

Three catalysts were prepared by supporting concentrated sulfuric acid on silica-alumina in a weight ratio of 1/3, 1/2, and 1/1, respectively. 10 Parts each of the catalysts obtained was added to 30 parts of monochlorobenzene, and the mixture was stirred. While maintaining the mixture at a temperature of not more than 25°C., 3 parts of nitric acid having a specific gravity of 1.52 was added over the course of 1 hour. The reaction mixture was further stirred for 1 hour, and the product was analyzed. The results are shown in Table 2.

It is seen from these Examples that the use of a catalyst having a lesser amount of sulfuric acid supported on silica-alumina gives a product having a higher p/o ratio.

Table 2

| Examples | Catalyst Silica-alumina/ sulfuric acid weight ratio | Composition (%) of the product | | | p/o | Yield (%) |
|---|---|---|---|---|---|---|
| | | p-isomer | m-isomer | o-isomer | | |
| 2 | 3/1 | 74.5 | 0 | 25.5 | 2.92 | 56 |
| 3 | 2/1 | 72.3 | 0.5 | 27.2 | 2.66 | 87 |
| 4 | 1/1 | 69.5 | 0.5 | 30.6 | 2.62 | 79 |

EXAMPLE 5

A catalyst was prepared by supporting 6 parts of concentrated sulfuric acid on 14 parts of acid clay. The catalyst was then added to 30 parts of monochlorobenzene, and while the mixture was being maintained at a temperature of not more than 40°C., 3 parts of nitric acid was added over the course of 40 minutes. The mixture was further stirred for 10 minutes, and the resulting product was analyzed. The results are shown in Table 3.

EXAMPLE 6

The same catalyst as used in Example 5 was calcined at 200°C. for 1 hour, and using the calcined catalyst the nitration of monochlorobenzene was carried out under the same conditions as set forth in Example 5. The results are shown in Table 3.

COMPARATIVE EXAMPLE 3

Monochlorobenzene was nitrated in the same way as in Examples 5 to 6 using only the acid clay used in Examples 5 and 6. The results are shown in Table 3.

Table 3

| Catalyst | | Composition (%) of the reaction product | | | p/o | Yield (%) |
|---|---|---|---|---|---|---|
| | | p-isomer | m-isomer | o-isomer | | |
| Example 5 | Sulfuric acid supported acid clay | 67.0 | 0.4 | 32.6 | 2.06 | 62 |
| Example 6 | Same as in Example 5 but calcined | 69.1 | 0.2 | 30.7 | 2.25 | 80 |
| Comparative Example 3 | Acid clay | 60.9 | 0.9 | 38.2 | 1.60 | 22 |

EXAMPLE 7

9 Parts of concentrated sulfuric acid was added to 21 parts of pulverized γ-alumina (80 mesh), and the mixture was well stirred, followed by calcination at 200°C. for 1 hour to form 27.5 parts of a catalyst.

20 Parts of the catalyst was added to 30 parts of monochlorobenzene, and 3 parts of nitric acid having a specific gravity of 1.52 was added at 22°C. over the course of 1 hour. The mixture was further stirred for an additional 10 minutes. The reaction product was analyzed and the results obtained are shown in Table 4.

Table 4

| Composition (%) of the reaction product | | | p/o | Yield (%) |
|---|---|---|---|---|
| p-isomer | m-isomer | o-isomer | | |
| 74.0 | 0.2 | 25.8 | 2.87 | 40 |

EXAMPLE 8

10 Parts of the same catalyst as used in Example 1 was added to 20 parts of monobromobenzene, and its nitrration was carried out using 2 parts of nitric acid in the same way as in Example 1. The results are shown in Table 5.

Table 5

| Composition (%) of the reaction product | | | p/o | Yield (%) |
|---|---|---|---|---|
| p-isomer | m-isomer | o-isomer | | |
| 70.2 | 0.8 | 29.0 | 2.42 | 84 |

EXAMPLE 9

10 Parts of 85% phosphoric acid was added to 30 parts of γ-alumina powder (80 mesh), and the mixture was stirred to support the phosphoric acid uniformly. The catalyst was calcined at 400°C. for 2 hours to form 33.9 parts of a calcined catalyst.

20 Parts of the calcined catalyst was added to 30 parts of monochlorobenzene, and with stirring, 3 parts of fuming nitric acid having a specific gravity of 1.52 was added dropwise at 40° to 50°C. over the course of 35 minutes. The resulting product was analyzed, and the results are shown in Table 7.

COMPARATIVE EXAMPLE 4

A mixture of 30 parts of monochlorobenzene and 6 parts of phosphoric anhydride was stirred, and 3 parts of fuming nitric acid was added. The reaction was performed under the same conditions as in Example 9. The results are shown in Table 7.

Table 7

| Catalyst | | Composition (%) of the product | | | p/o | Yield (%) |
| --- | --- | --- | --- | --- | --- | --- |
| | | p-isomer | m-isomer | o-isomer | | |
| Example 9 | Phosphoric acid-supported γ-alumina | 71.4 | — | 28.6 | 2.5 | 92 |
| Comparative Example 4 | Phosphoric anhydride | 64.5 | 0.5 | 35.0 | 1.8 | 79 |

EXAMPLE 10

10 Parts of 85% phosphoric acid was added to 3.0 parts of silica-alumina powder (80 mesh; alumina content 13% by weight, surface area 450 m²/g), and the mixture was stirred to support the phosphoric acid uniformly, followed by calcination at 400°C. for 2 hours to form 31.9 parts of a catalyst.

20 Parts of this catalyst was added to 30 parts of monochlorobenzene, and with stirring, 3 parts of fuming nitric acid (specific gravity 1.52) was added at 22° to 33°C. The mixture was stirred for 1 hour, and the resulting product was analyzed by gas-chromatography. The results obtained are shown in Table 8.

Table 8

| Catalyst | | Composition (%) of the product | | | p/o | Yield (%) |
| --- | --- | --- | --- | --- | --- | --- |
| | | p-isomer | m-isomer | o-isomer | | |
| Example 10 | Phosphoric acid supported silica alumina | 66.8 | 0.3 | 32.8 | 2.0 | 91.5 |
| Comparative Example 2 | Silica-alumina | 60.0 | 0.3 | 39.7 | 1.5 | 17.0 |

EXAMPLES 11 TO 13

Three catalysts were prepared by supporting concentrated phosphoric acid on γ-alumina at a weight ratio of 1/3, 1/2, and 1 respectively, and calcining the supported catalyst at 400°C. for 1 hour.

20 Parts of each of these catalysts was added to 30 parts of monochlorobenzene, and the mixture was stirred and maintained at 45° to 55°C., followed by adding 2 parts of nitric acid having a specific gravity of 1.52 over the course of 1 hour. After stirring for an additional 3 hours, the product obtained was analyzed. The results are shown in Table 9.

Table 9

| Examples | Catalyst Alumina/ phosphoric acid weight ratio | Composition (%) of the product | | | p/o | Yield (%) |
| --- | --- | --- | --- | --- | --- | --- |
| | | p-isomer | m-isomer | o-isomer | | |
| 11 | 3/1 | 69.0 | 0.5 | 30.5 | 2.3 | 87 |
| 12 | 2/1 | 67.2 | 0.6 | 32.2 | 2.1 | 81 |
| 13 | 1/1 | 65.4 | 0.6 | 34.0 | 1.9 | 61 |

EXAMPLE 14

20.9 Parts of γ-alumina pulverized to a size of not more than 60 mesh was added to a solution of 10.5 parts of phosphorous acid in 10 parts of water, and the mixture was stirred to support the phosphorous acid uniformly, followed by evaporating off water in a dryer at 140°C. Then, the supported catalyst was calcined at 400°C. for 3 hours to form 27.8 parts of a calcined catalyst.

20 Parts of the catalyst was added to 30 parts of chlorobenzene, and with stirring at 70°C., 2 parts of nitric acid (specific gravity 1.52) was added dropwise for 1 hour. The mixture was stirred for an additional 1 hour, and the product was analyzed. It was found that the product comprises 65.7% of a p-isomer and 33.6% of an o-isomer (the p/o ratio being 1.95), and the yield of the product based on nitric acid was 70%.

EXAMPLE 15 AND COMPARATIVE EXAMPLE 5

100 Parts of silica alumina powder (80 mesh; alumina content 13% by weight; surface area 450 m²%g) was added to a mixture of 34 parts of concentrated sulfuric acid and 100 parts of water, and the mixture was stirred, followed by evaporating off water in a dryer at 140°C., and then calcining the mixture at 200°C. for 3 hours.

20 Parts of the catalyst so prepared was added to 30 parts of o-chlorotoluene, and with stirring at 20°C., 5 parts of nitric acid having a specific gravity of 1.4 was added dropwise over the course of 30 minutes. The mixture was then stirred for an additional 30 minutes.

For comparison, the above procedure was repeated using concentrated sulfuric acid (Comparative Example 5).

The product was analyzed by gas-chromatography. The column used was a Golay-Column (45 m) coated with SE30 silicone oil gumrubber, and a Carbowax 20M packed column (2m) at 160°C.

The compositions of the products are shown in Table 10.

Table 10

| | Composition (%) of the product | | | | p/o ratio |
| --- | --- | --- | --- | --- | --- |
| | 2-chloro-5-nitro-toluene (p-isomer) | 2-chloro-3-nitro-toluene (o-isomer) | 2-chloro-4-nitro-toluene | 2-chloro-6-nitro-toluene | |
| Example 15 | 50.3 | 18.0 | 14.5 | 17.2 | 2.79 |
| Comparative Example 5 | 43.8 | 20.8 | 13.4 | 22.0 | 2.10 |

As compared with the case of using concentrated sulfuric acid alone, the amount of the p-isomer increased, and the amount of the o-isomer decreased according to the present invention. Thus, the p/o ratio increased from 2.10 to 2.79.

The experiment in Comparative Experiment 5 was as follows:

3.5 Parts of concentrated sulfuric acid was added to 30 parts of o-chlorotoluene, and with stirring at 20°C., 5 parts of nitric acid having a specific gravity of 1.4 was added over the course of 30 minutes. The mixture was further stirred for an additional 30 minutes. The product was analyzed in the same way as in Example 15 above.

EXAMPLE 16 AND COMPARATIVE EXAMPLE 6

20 Parts of the same sulfuric acid-supported silica alumina catalyst as used in Example 15 was added to 30 parts of monochloro-p-xylene, and with stirring at 20°C., 4.5 parts of nitric acid having a specific gravity of 1.4 was added dropwise over the course of 30 minutes. The mixture was stirred for an additional 30 minutes. The product was analyzed by gas-chromatography in the same way as in Example 15.

The proportion of 2-chloro-5-nitro compound (compound in which a nitro group was substituted at the p-position to the chlorine atom) was 76.6%.

The above procedure was repeated except that 3.5 parts of concentrated sulfuric acid was used instead of the sulfuric acid-supported silica alumina catalyst. The proportion of the 2-chloro-5-nitro compound in the reaction product was 65.9%.

EXAMPLE 17

20 Parts of the same sulfuric acid-supported silica-alumina catalyst as used in Example 15 was added to 30 parts of m-chlorotoluene, and in the same way as in Example 15, 4.5 parts of nitric acid having a specific gravity of 1.4 was added to perform the nitration of m-chlorotoluene. The product was analyzed by gas chromatography using an SE30 Golay column (45 m) at 130°C. The proportion of 3-chloro-6-nitrotoluene was 53%.

EXAMPLE 18

20 Parts of the same sulfuric acid-supported silica alumina catalyst as used in Example 15 was added to 30 parts of o-dichlorobenzene, and with stirring at 20°C., 3 parts of fuming nitric acid having a specific gravity of 1.52 was added dropwise over the course of 1 hour. After stirring for an additional 1 hour, the product was analyzed by gas-chromatography. The proportion of 1,2-dichloro-4-nitrobenzene in the product was 90.4%.

What we claim is:

1. A process for nitrating halogenated benzene derivatives, which comprises reacting a halogenated benzene derivative with nitric acid in the liquid phase in the presence of a catalyst composed of an oxyacid of sulfur or phosphorus supported on silica-alumina and/or alumina.

2. The process of claim 1 wherein said halogenated benzene derivative is expressed by the following formula

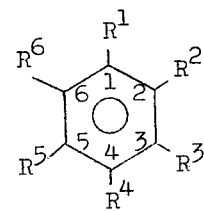

wherein $R_1$ is a halogen atom; $R^4$ is a hydrogen atom; $R^2$, $R^3$, $R^5$ and $R^6$ independently represent a hydrogen atom, a halogen atom or an alkyl group; at least one of $R^2$, $R^3$, $R^5$ and $R^6$ is a hydrogen atom; the total number of halogen atoms is not more than 3 including $R^1$; when there is one halogen atom and both $R^3$ and $R^6$ are alkyl groups, $R^2$ is a hydrogen atom; when there are two halogen atoms and $R^3$ is a halogen atom, $R^2$ is a hydrogen atom, and when there are two halogen atoms and $R^2$ is a halogen atom, at least one of $R^3$ and $R^6$ is a hydrogen atom; when there are three halogen atoms, $R^2$ is a halogen atom and $R^5$ is a hydrogen or halogen atom; and when there are at least 2 halogen atoms including $R^1$, the substitutent halogen atoms are substituted at positions such that the sum of the numbers 1 to 6 showing the substituting positions attached to the inside of the benzene ring in the above formula becomes minimum.

3. The process of claim 1 wherein said halogenated benzene derivative is a chlorinated benzene derivative.

4. The process of claim 2 wherein at least 2 of $R^2$, $R^3$, $R^5$ and $R^6$ are hydrogen atoms.

5. The process of claim 4 wherein $R^2$, $R^3$, $R^5$ and $R^6$ are hydrogen atoms or alkyl groups.

6. The process of claim 1 wherein said catalyst is prepared by impregnating the carrier with sulfuric acid or phosphoric acid, and then calcining it at a temperature of at least 100°C.

* * * * *

UNITED STATES PATENT OFFICE
CERTIFICATE OF CORRECTION

Patent No. 3,928,476  Dated December 23, 1975

Inventor(s) SHIMADA, ET AL.

It is certified that error appears in the above-identified patent and that said Letters Patent are hereby corrected as shown below:

Item 73 should read:  -- Teijin, Ltd., Osaka, Japan --

Signed and Sealed this twenty-third Day of March 1976

[SEAL]

Attest:

RUTH C. MASON
*Attesting Officer*

C. MARSHALL DANN
*Commissioner of Patents and Trademarks*